United States Patent [19]

Saelens et al.

[11] Patent Number: 5,679,441
[45] Date of Patent: Oct. 21, 1997

[54] PROCESS FOR CONTINUOUSLY MANUFACTURING A POROUS LAMINATE

[75] Inventors: Johan Saelens, Roeselare; Roger De Bruyne, Zulte; Ronny Losfeld, Waregem, all of Belgium

[73] Assignee: N.V. Bekaert S.A., Belgium

[21] Appl. No.: 454,221

[22] PCT Filed: Dec. 9, 1993

[86] PCT No.: PCT/BE93/00079

§ 371 Date: Jun. 12, 1995

§ 102(e) Date: Jun. 12, 1995

[87] PCT Pub. No.: WO94/14608

PCT Pub. Date: Jul. 7, 1994

[30] Foreign Application Priority Data

Dec. 18, 1992 [BE] Belgium .................. 9201110

[51] Int. Cl.[6] .................................................. B32B 27/14
[52] U.S. Cl. ........................ 428/198; 428/233; 428/256
[58] Field of Search ........................... 428/198, 233, 428/256

[56] References Cited

U.S. PATENT DOCUMENTS

| | | | |
|---|---|---|---|
| 3,127,668 | 4/1964 | Troy | 29/182 |
| 3,437,457 | 4/1969 | Fisher | 29/182.2 |
| 3,469,297 | 9/1969 | Webber | 29/180 |
| 3,505,038 | 4/1970 | Luksch et al. | 29/183.5 |
| 4,122,015 | 10/1978 | Oda et al. | 210/496 |
| 4,126,560 | 11/1978 | Marcus et al. | 210/489 |
| 4,312,670 | 1/1982 | Colucci | 75/200 |

*Primary Examiner*—Helen Lee
*Attorney, Agent, or Firm*—Nixon & Vanderhye P.C.

[57] ABSTRACT

A method for manufacturing a porous laminate includes continuously passing a laminate preform having a metal wire mesh and a metal non-woven fiber web superposed on the wire mesh between rotating pressure rollers having differing electrical potentials. The fibers of the non-woven web are sintered together at mutual points of contact and to the mesh by passing an electrical current cross-sectionally through the laminate preform in a zone of contact with the rollers, thereby forming the porous laminate.

11 Claims, 3 Drawing Sheets

PROCESS FOR CONTINUOUSLY MANUFACTURING A POROUS LAMINATE

The invention relates to a porous sintered laminate comprising a mesh of metal wires to which a non-woven web of metal fibers is bonded by a sintering operation. It relates also to a method for manufacturing this laminate.

Porous sintered metal fiber laminates reinforced with one or more metal wire meshes are generally known. U.S. Pat. No. 3,437,457, for example, relates to a layered porous structure in which a metal fiber web is bonded by sintering on at least one of its flat sides to a woven wire mesh. To accomplish this, the metal fiber web is pressed against the wire mesh under low pressure and heated so that diffusion bonds are formed in the mutual contact points of the fibers with one another and with the net. A sintered filter structure with homogenous porosity is known from German patent application 2,720,278. To produce it, woven and/or non-woven layers of thin stainless steel fibers possessing a polygonal cross-section are laid on top of one another and then sintered to one another by the simultaneous application of pressure and heat in an oven. These porous laminates are intended especially for use as depth filters, and therefore the percentage content of fibers in them is quite high. U.S. Pat. No. 4,126,560 can also be referred to as an example of the current state of the art.

It is an object of the invention to provide porous laminates that have a relatively low porosity combined with a satisfactory filtering capacity. In particular, the invention can provide such porous laminates in which the percentage content of fiber is relatively small compared to the space occupied by the metal wire mesh and whereby yet a sufficient filtering capacity is maintained. In this case this means that despite a relatively low fiber weight per $m^2$, sufficiently low porosities and suitable air permeabilities can nevertheless be achieved, particularly in the filter surface zones facing the wire mesh openings.

Another object of the invention is to provide filter laminates containing metal fiber, and relatively thin filter laminates in particular, which are capable of resisting high pressure drops and especially pressure pulses.

It is also the intention to provide filter laminates in which the bonding between fibers and wire mesh is so strong that the fiber layers can in fact no longer be pulled apart from the mesh.

Next, and in contrast to the continuous sintering process in ovens according to the state of the art, it is an object of the invention to provide a specific continuous sintering process that does not require the use of an oven. In particular, with this specific continuous sintering method it is an object of the invention to provide a universal, economical and flexible manufacturing method, which in principle makes it possible to utilize simpler and less expensive sintering installations. More in particular, this new continuous method should enable the realization of new specific filter structures with special filtering characteristics, including the laminates containing metal fibers which are intended by the present invention.

According to the present invention, these objectives are fulfilled by a porous laminate comprising a metal wire mesh consisting of mutually crossing wires upon which a non-woven web of metal fibers sintered to one another under pressure is attached, in which the porosity of the web in the region of the mesh junction points is at most 40%—and preferably not more than 25%—of that in the central zones of the mesh openings between the aforementioned junction points. For particular applications, a porosity ratio of even lower than 15% can be selected.

The economical method of producing the porous laminate envisaged by the invention works as follows: a metal wire mesh together with a metal fiber web laid on top of it is advanced continuously between rotating pressure rollers which are charged with different electrical potentials such that an electrical current flows through the cross-section of the laminate in the zone of contact with the rollers in view of sintering the fibers to one another at their points of mutual contact and to the mesh.

All this will now be explained in connection with particular embodiments of the invention with reference to the accompanying drawings. Additional characteristics and advantages will also be clarified.

FIG. 1 relates to a cross-section of a porous laminate according to the invention.

Figure 1:
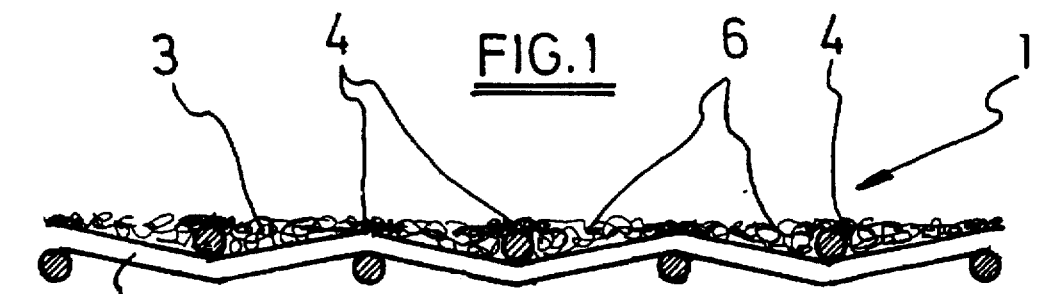

The porous laminate 1 sketched in FIG. 1, comprises a woven metal wire mesh 2 consisting of warp and weft wires crossing one another, to which a non-woven web 3 is bonded by sintering. The wires of the mesh are, for example, stainless steel wires obtained by means of wire drawing. The web 3 consists of metal fibers composed, for example, of stainless steel fibers 5 which have been obtained, for example, by means of bundled drawing or by a cutting or machining operation. As is known, these fibers normally have an irregular surface with a number of sharply outlined irregularities 10, grooves and sharp edges resulting from a polygonal cross-section, etc. The use of these fibers 5 and the dry method of web formation is known in itself, for example, from U.S. Pat. Nos. 3,469,297 or 3,505,038. The fibers have a cross-sectional surface area of between $3 \times 10^{-6}$ $mm^2$ and $1.8 \times 10^{-2}$ $mm^2$, and preferably between $1.2 \times 10^{-5}$ and $3 \times 10^{-3}$ $mm^2$, and even more preferably between $5 \times 10^{-5}$ and $7.5 \times 10^{-4}$ $mm^2$.

Figure 2:
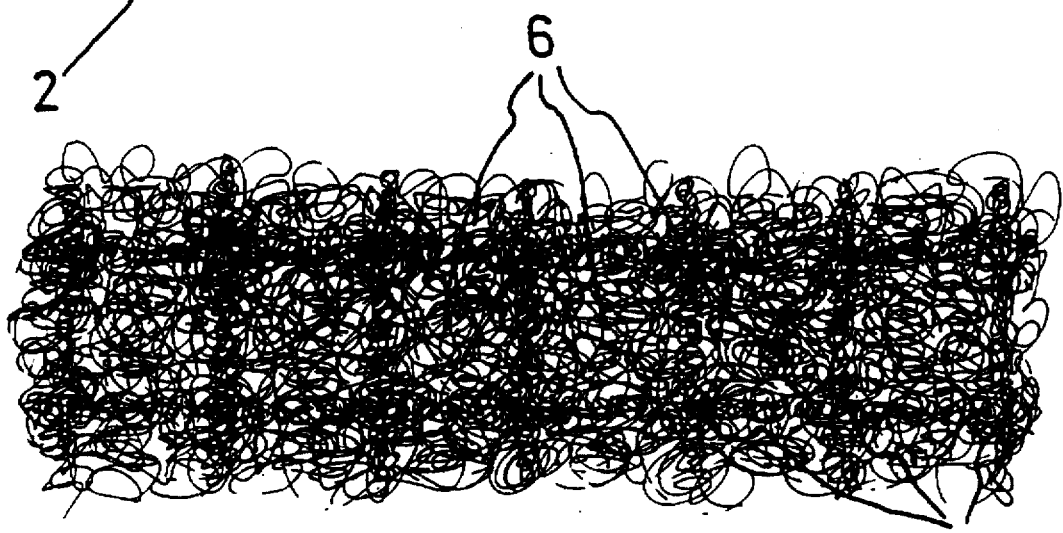
FIG. 2 shows a view from above of the laminate according to FIG. 1.
Figure 3:
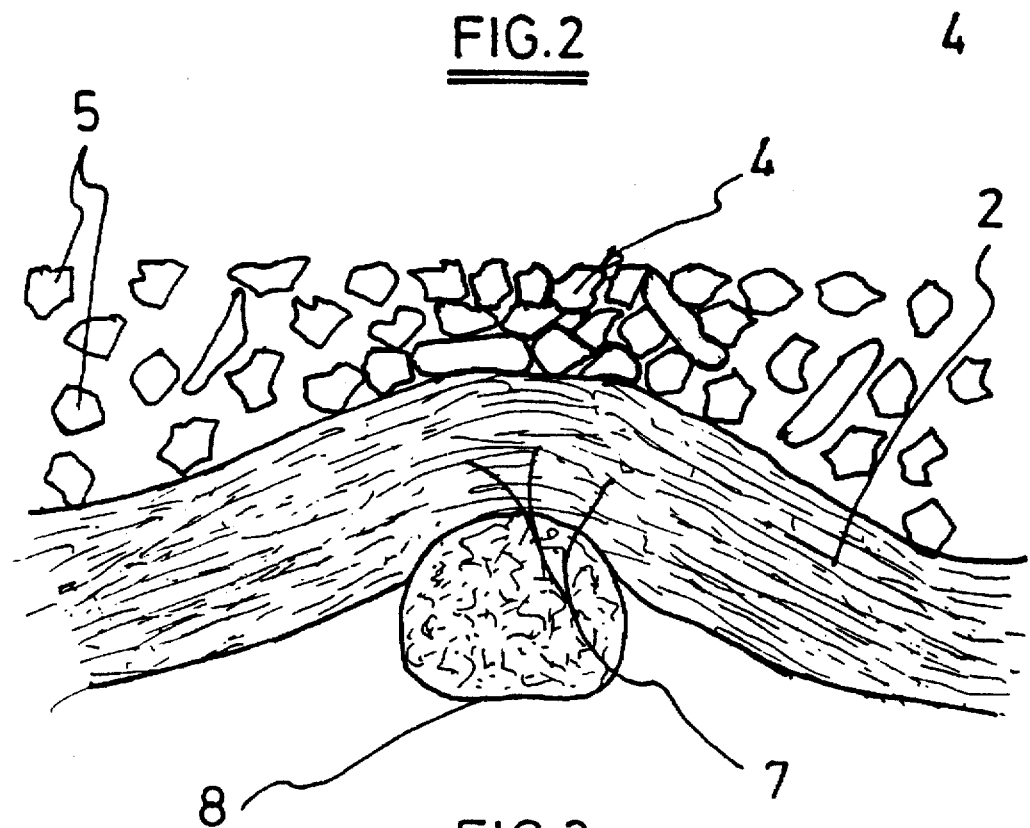
FIG. 3 is an enlargement of the cross-section according to FIG. 1.

The new and specific consolidation operation of wire mesh 2 with web 3 comprises a sintering operation under high pressure which is described below. According to the invention, this results in a laminated structure with strongly compressed zones in the region of the mesh junction points 4 of the net as illustrated in FIG. 2. Between these compressed zones 4, particularly in the region or area of the centers 6 of the mesh openings, more porous zones are present. This characteristic is also visible in the cross-section sketch in FIG. 3. This sketch, moreover, clearly illustrates the irregular cross-section of the fibers 5. As a consequence of the strong compression of the laminate during sintering the mesh wires normally acquire a flattened zone 8, at least in the zone of the junctions 4, among other places on the outer side facing away from the web 3. The compacted fibers also display a somewhat flattened cross-section in this zone.

Figure 4:
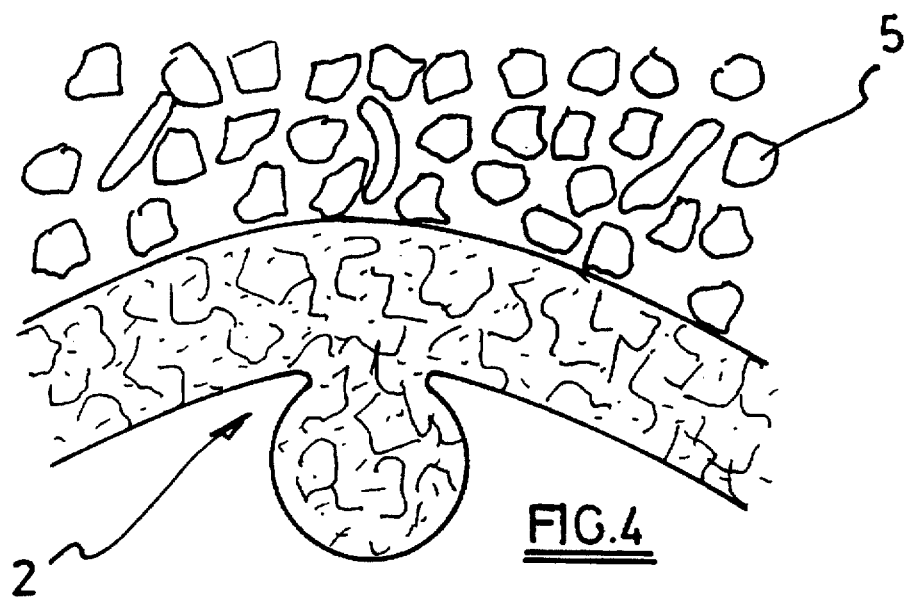
FIG. 4 is an enlargement of a cross-section of a porous laminate according to the state of the art.
Figure 5:
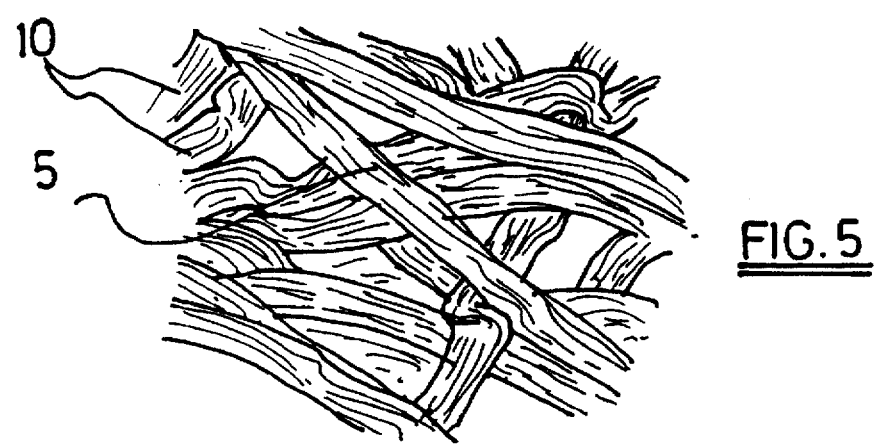
FIG. 5 shows an enlargement of the appearance of the surface of the fibers in the web, which is part of a laminate according to the invention.
Figure 6:
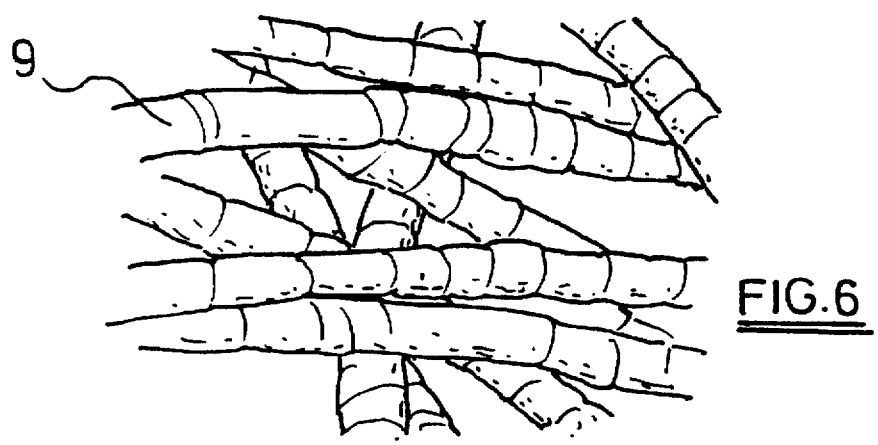
FIG. 6 shows an analogous appearance of the fibers in a porous laminate according to the state of the art.

The sintering process according to the invention does not bring about any significant recrystallization in the steel wire mesh or in the fibers. The linearly oriented metallographic structure 7, a result of the wire drawing, is largely conserved after sintering, (see FIG. 3). This contrasts with a classical sintering process, in which a significant recrystallization does occur, as is represented in FIG. 4. With a classical process the web compression in the region of the mesh junctions 4 is also much less pronounced or even absent. After sintering according to the invention the fibers largely retain their rough, uneven surface with sharply outlined irregularities or striations 10, as sketched in FIG. 5. With a classical sintering process, however, many of these original surface grooves or ribs disappear, which results in a surface possessing a kind of bamboo structure 9, as shown in FIG. 6. FIG. 5 also shows that the fibers become more firmly entangled and anchored in one another as a result of the high pressure at the mutual crossing points. The further consolidation resulting from the sintering has the consequence, then, that the fibers become bonded very strongly to one another and to the mesh, so that it becomes virtually impossible for them to tear loose.

Figure 7:
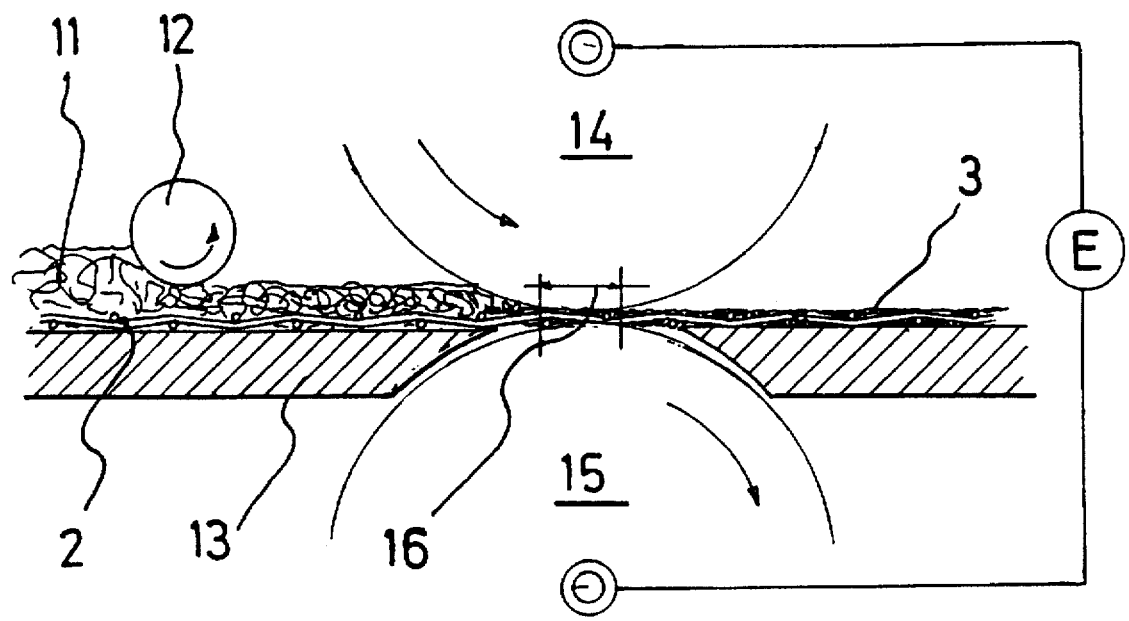
FIG. 7 represents schematically in cross-section an apparatus for the continuous production of a porous laminate according to the invention.

The continuous manufacture of the porous laminate according to the invention works as follows. A relatively highly porous metal fiber web 11 is laid down over a metal wire mesh 2 and, after an optional light pre-compression treatment using a roller 12, this layered structure is fed continuously over a feed table 13 through the actual consolidation device (FIG. 7). This device comprises essentially a system of metal pressure rollers 14 and 15, between which a difference of potential is set from an electrical source E such that an electrical current will flow over the cross-section of the laminate in the narrow, strip-shaped zone of contact 16 with the rollers, which section lies perpendicular to the direction of movement of the laminate.

The difference of electrical potential can, if so desired, be regulated according to the nature and characteristics of the laminate. In fact, the electrical current, whether DC or AC, has the effect of a resistor heating process, which results in the fibers being sintered together at their contact points.

However, since the contact time is relatively short, very high pressures are required. These high pressures then result in a high degree of compression and a local flattening, a pressing into one another or constriction of the fibers and mesh wires in the region of the junctions 4 (see FIG. 5). One consequence, then, is that there is often a local flattening 8 of the wires 2 on their exterior sides. In practice it is virtually impossible to realize the same sintering bonding characteristics with a classical sintering process in an oven since the pressure forces applied there over great surface areas would have to be much too high. It would also be impossible to achieve the same sintering bonding characteristics and the low porosities by means of the cold rolling that is usually done to compress the sintered porous fiber structures after a classical sintering treatment, whether in a discontinuous or a continuous process. The cold rolling pressure would have to be so high that the porous web structure would be crushed in the region of the mesh junctions.

EXAMPLE

A number of non-woven webs having weights of either 300 g/m² or 600 g/m² and made of stainless steel fibers of the 316L type, which is obtained by bundled drawing, were combined according to the invention with various woven wire gauzes, each having a thickness of 0.5 mm (i.e. with wire diameters of 0.25 mm). The mesh sizes of the gauzes or nets in this case differed as indicated in the table below. Various equivalent fiber diameters of resp. 8, 12 and 22 microns were also utilized.

The laminates were fed into an apparatus as shown in FIG. 7 between two pressure rollers 14 and 15, at a suitable speed, for example, of between 0.1 and 5 m/min. The pressure exerted on the laminate passing between the rollers was of the order of between 10 and 30 N/mm² and the tension applied resulted in a current through the cross-section of the laminate running up to 25,000 A for a laminate breadth of 40 mm. The apparatus was equipped with a current control device to avoid current picks or short circuiting.

The table below gives the average air permeability values (AP) recorded at a pressure gradient of 200 Pa. In each case the test section had a surface area of 0.62 cm². By way of comparison, in test no. 13 an analogous laminate construction was tested which had been sintered in a customary way (discontinuously) in a vacuum oven. (See also FIG. 4.) This laminate was therefore considerably thicker—0.82 mm—which resulted in the air permeability being nearly four times as great as compared with test no. 3. The pore size (MFP—mean flow pore size) is also given.

It was also found that it is impossible to pull or tear the web loose from the wire mesh in the laminates according to the invention, whereas this was possible with the classical laminate as in test 13.

TABLE

| TEST NO. | FIBER Ø (µm) | WEB WEIGHT | WIRE MESH OPENING (mm) | AP l/dm² · min at 200 Pa X | MFP µm X | THICK-NESS (mm) |
| --- | --- | --- | --- | --- | --- | --- |
| 1 | 22 | 600 | 0.4 | 264 | 23 | 0.63 |
| 2 | 22 | 300 | 0.4 | 707 | 35 | 0.44 |
| 3 | 12 | 600 | 0.4 | 111 | 15 | 0.52 |
| 4 | 12 | 600 | 0.45 | 112 | 15 | 0.49 |
| 5 | 12 | 600 | 0.63 | 141 | 17 | 0.47 |
| 6 | 12 | 600 | 1.25 | 178 | 22 | 0.45 |
| 7 | 12 | 300 | 0.4 | 360 | 23 | 0.44 |
| 8 | 12 | 300 | 0.45 | 359 | 24 | 0.44 |
| 9 | 12 | 300 | 0.63 | 497 | 27 | 0.40 |
| 10 | 12 | 300 | 1.25 | — | — | — |
| 11 | 8 | 600 | 0.4 | 46 | 10 | 0.57 |
| 12 | 8 | 300 | 0.4 | 159 | 16 | 0.47 |
| 13 | 12 | 600 | 0.4 | 435 | 30 | 0.82 |

It is easy to deduce from this table that for the same mesh opening and the same web weight the air permeability rises considerably with the increasing fiber diameter. On the other hand, with the same mesh opening and an increasing web weight, the air permeability will naturally decrease. In absolute value the decrease will be greater for thicker fibers than for thinner ones. Finally, at constant web weight and fiber diameter there is a decrease in air permeability as the mesh size decreases. The influence of the mesh size is relatively less important, however, than a change in web weight or fiber diameter.

Moreover, it is possible to deduce from test no. 10 that with a low web weight and at the same time a relatively large mesh opening the fibers probably form insufficient numbers of bridges between one another and between neighbouring mesh junctions to provide reproducible filtering characteristics.

In stead of fibers obtained by means of bundled drawing, steel wool or other metal fibers obtained by shaving or cutting (as described e.g. in EP 319.959) can be utilized and, after being processed into non-woven webs, they can be combined with appropriate mesh structures. Such fibers and webs thus obtained have been described, for example, in U.S. Pat. No. 3,505,038. Metal fibers that have been obtained directly from the meltage (molten metal) can also be utilized (such as are known from U.S. Pat. No. 3,845,805 or G.B. patent 1,455,705) or that have been obtained by means of reducing metal oxide mixtures (U.S. Pat. No. 3,671,228 and U.S. Pat. No. 4,312,670). The web formation can also be carried out by means of a wet method, as is known from or analogous to U.S. Pat. No. 3,127,668.

A knitted structure can, if so desired, also be utilized as wire mesh. The cross-section of the mesh wires need not necessarily be round: it can also be rectangular, for example. In certain cases the metal fiber web can also be sandwiched as a central filtering layer between two wire meshes which are sintered on both sides of the webs. The wire mesh on one side of the web can then consist of thinner wires (e.g. wire diameter of 0.1 mm) than that on the other side (diameter 0.2 mm). In addition, more fiber web layers can be sintered on top of one another with a wire mesh, with the fiber diameter, for example, differing from one layer to another. The web weight can vary between 100 g/m$^2$ and 4 kg/m$^2$. If so desired, knitted or woven nets with small meshes can be stacked crosswise on top of one another and sintered to one another using the method accor-ding to the invention.

The metal fiber alloy utilized need not be limited to the various stainless steels. The use of nickel, Inconel® and Hastelloy® fibers, as well as corrosion, abrasion and/or high-temperature resistant metal fibers (e.g. made of FeCrAlloy® alloys) may also be considered.

The laminate according to the invention has a very broad range of applications or uses, e.g. as filter medium. In the first instance, utilizing them as filters for air bags is considered, which bags are currently being installed in the steering columns or dashboards of some cars and that serve as cushions between passengers and the steering wheel or dashboard in case of a head-on collision. Currently, sintered metal web filters are often incorporated in these air bags for filtering the suddenly expanding gas that is released to rapidly blow up the bag when an impact shock is detected. These fiber filters must naturally be very resistant to pressure waves and shocks. The tight filter structure according to the invention is extremely well-suited to this.

In general, it is also possible to adapt the characteristics of the relatively thin filter structures of fairly low porosity in order to utilize them as surface filters. Sol-gel suspensions (e.g. ZrO$_2$) can also be deposited on them, or diamond like coatings, so they can be used as inorganic membrane filters in micro or ultrafiltration, whether with tangential (cross flow) or crossways ("dead end") flow.

If high temperature resistant fibers—such as FeCrAlloy fibers—are utilized, the sintered laminates according to the invention can also be used as a flat or tube-shaped membrane for surface radiation burners or as recyclable filter for soot particles from diesel exhaust gases, for example.

Either before or after sintering the fibers can be coated, for example, with catalytically active substances so that the laminate can then be utilized as a catalyst. Coatings on the fibers consisting of oxidative catalyzers are good candidates for removing soot particles easily and at low temperatures which soot particles can be caught or arrested in diesel exhaust filters. Laminates according to the invention, comprising nickel or nickel alloy fibers, can also be utilized as electrodes.

Custom filter systems according to the invention can be designed in which a combination of one or more laminates according to the invention are installed in flat form or in tube form, whether or not combined with other filter media.

We claim:

1. A method for manufacturing a porous laminate comprising the steps of:

(a) continuously passing a laminate preform comprised of a metal wire mesh and a metal non-woven fiber web superposed on said wire mesh between rotating pressure rollers having differing electrical potentials; and (b) sintering the fibers of the non-woven web together at mutual points of contact and to the mesh by passing an electrical current cross-sectionally through the laminate preform in a zone of contact with the rollers, thereby forming said porous laminate.

2. A method as in claim 1, wherein step (a) includes locally flattening an exterior portion of the non-woven web wires between said rotating pressure rollers.

3. A method as in claim 1, wherein step (b) is practiced such that said laminate has a ratio of porosity in the region of crossing wire junctions of the metal mesh which is at most 40% of the porosity of said laminate in central zones of mesh openings established between said crossing wire junctions.

4. A method as in claim 1, wherein step (b) is practiced so that the laminate has a porosity of at most 25%.

5. A method as in claim 4, wherein the porosity is less than 15%.

6. A method as in claim 1, wherein step (a) is practiced such that the fibers have an uneven surface with sharply outlined irregularities or striations.

7. A method as in claim 1, wherein the fibers have a cross-sectional surface area of between $3 \times 10^{-6}$ mm$^2$ and $1.8 \times 10^{-2}$ mm$^2$.

8. A method as in claim 7, wherein the surface area of between $1.2 \times 10^{-5}$ mm$^2$ and $3 \times 10^{-3}$ mm$^2$.

9. A method as in claim 8, wherein the surface area of between $5 \times 10^{-5}$ mm$^2$ and $7.5 \times 10^{-3}$ mm$^2$.

10. A method as in claim 1, wherein the mesh wires in the region of the junctions have a flattened zone on the other side facing away from the web.

11. A method as in claim 1, wherein the wires of the mesh display a non-recrystallized structure.

* * * * *